US006727914B1

United States Patent
Gutta

(10) Patent No.: US 6,727,914 B1
(45) Date of Patent: Apr. 27, 2004

(54) METHOD AND APPARATUS FOR RECOMMENDING TELEVISION PROGRAMMING USING DECISION TREES

(75) Inventor: Srinivas Gutta, Buchanan, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/466,406

(22) Filed: Dec. 17, 1999

(51) Int. Cl.[7] ................................................. G09G 5/00
(52) U.S. Cl. ......................... 345/719; 345/853; 725/46
(58) Field of Search ................................. 345/719–722, 345/853; 725/39, 45–47

(56) References Cited

U.S. PATENT DOCUMENTS

| 4,264,924 A | | 4/1981 | Freeman |
| 4,264,925 A | | 4/1981 | Freeman et al. |
| 5,223,924 A | * | 6/1993 | Strubbe ........................ 725/46 |
| 5,340,317 A | | 8/1994 | Freeman |
| 5,355,480 A | | 10/1994 | Smith et al. |
| 5,608,662 A | | 3/1997 | Large et al. |
| 5,758,259 A | * | 5/1998 | Lawler ......................... 348/563 |
| 5,799,311 A | | 8/1998 | Agrawal et al. |
| 5,801,747 A | * | 9/1998 | Bedard ......................... 725/13 |
| 5,870,735 A | | 2/1999 | Agrawal et al. |
| 5,973,683 A | * | 10/1999 | Cragun et al. ................ 345/719 |
| 6,029,195 A | * | 2/2000 | Herz ............................ 707/10 |
| 6,088,722 A | * | 7/2000 | Herz et al. ................... 709/217 |
| 6,163,316 A | * | 12/2000 | Killian ........................ 345/708 |
| 6,236,395 B1 | * | 5/2001 | Sezan et al. ................. 345/723 |
| 6,493,688 B1 | * | 12/2002 | Das et al. .................... 706/20 |

FOREIGN PATENT DOCUMENTS

| EP | 0854645 A2 | | 7/1998 |
| EP | 000854645 A2 | * | 7/1998 |

* cited by examiner

Primary Examiner—Sy D. Luu

(57) ABSTRACT

A method and apparatus are disclosed for recommending television programming using decision trees. Inductive principles are utilized to identify a set of recommended programs that may be of interest to a particular viewer, based on past viewing behavior. A user's viewing history is monitored and the shows that are actually watched by a user (positive examples) and the shows that are not watched by the user (negative examples) are analyzed. For each positive and negative program example (i.e., programs watched and not watched), a number of program attributes are classified in the user profile. The various attributes are then positioned in a hierarchical decision tree based on a ranking of the entropy of each attribute. Each node and sub-node in the decision tree corresponds to a given attribute from the user profile. Each leaf node in the decision tree corresponds to either a positive or negative recommendation for a program mounted at the corresponding leaf node. The decision tree is built using a decision tree process that implements a "top-down divide and conquer" approach. The decision tree can thereafter be applied to an electronic program guide to make program recommendations.

22 Claims, 5 Drawing Sheets

| CLASS 510 | SIZE 520 | COLOR 530 | SURFACE 540 |
|---|---|---|---|
| A | SMALL | YELLOW | SMOOTH |
| A | MEDIUM | RED | SMOOTH |
| A | MEDIUM | RED | SMOOTH |
| A | BIG | RED | ROUGH |
| B | MEDIUM | YELLOW | SMOOTH |
| B | MEDIUM | YELLOW | SMOOTH |

500

METHOD AND APPARATUS FOR RECOMMENDING TELEVISION PROGRAMMING USING DECISION TREES

FIELD OF THE INVENTION

The present invention relates to a method and apparatus for recommending television programming, and more particularly, to a method and apparatus for recommending television programming through the use of decision trees.

BACKGROUND OF THE INVENTION

As the number of channels available to television viewers has increased, along with the diversity of the programming content available on such channels, it has become increasingly challenging for television viewers to identify television programs of interest. Historically, television viewers identified television programs of interest by analyzing printed television program guides. Typically, such printed television program guides contained grids listing the available television programs by time and date, channel and title. As the number of television programs has increased, the ability to effectively identify desirable television programs using such printed guides has become impractical.

More recently, television program guides have become available in an electronic format, often referred to as electronic program guides (EPGs). Like printed television program guides, EPGs contain grids listing the available television programs by time and date, channel and title. An EPG, however, allows television viewers to sort or search the available television programs in accordance with personalized preferences. In addition, EPGs allow for on-screen presentation of the available television programs.

While EPGs allow viewers to identify desirable programs more efficiently than conventional printed guides, they suffer from a number of limitations, which if overcome, could further enhance the ability of viewers to identify desirable programs. For example, many viewers have a particular preference towards, or bias against, certain categories of programming, such as action-based programs or sports programming. Thus, the viewer preferences can be applied to the EPG to obtain a set of recommended programs that may be of interest to a particular viewer.

Thus, a number of tools have been proposed or suggested for recommending television programming. The Tivo ™ system, for example, commercially available from Tivo, Inc., of Sunnyvale, Calif., allows viewers to rate shows using a "Thumbs Up and Thumbs Down" feature and thereby indicate programs that the viewer likes and dislikes, respectively. Thereafter, the TiVo receiver matches the recorded viewer preferences with received program data, such as an EPG, to make recommendations tailored to each viewer.

Thus, such tools for recommending television programming provide selections of programs that a viewer might like, based on the viewer's past viewing history as well as a profile containing viewer preferences. In fact, such tools for recommending television programming generally require explicit profile information from the user. Viewers, however, may not take the time required to sufficiently detail their viewing preferences in a user profile. A need therefore exists for a method and apparatus for recommending television programming based on the viewer's past viewing history. A further need exists for a method and apparatus for recommending television programming that does not require any explicit profile information from the viewer.

SUMMARY OF THE INVENTION

Generally, a method and apparatus are disclosed for recommending television programming using decision trees. According to one aspect of the invention, inductive principles are utilized to identify a set of recommended programs that may be of interest to a particular viewer, based on the past viewing history of a user.

The present invention monitors a user's viewing history and analyzes the shows that are actually watched by a user (positive examples) and the shows that are not watched by the user (negative examples). For each positive and negative program example (i.e., programs watched and not watched), a number of program attributes are classified in the user profile, such as the time, date, duration, channel, rating, title and genre of a given program. The various attributes are then positioned in the hierarchical decision tree based on a ranking of the entropy of each attribute. Each node and sub-node in the decision tree corresponds to a given attribute from the user profile. Each leaf node in the decision tree corresponds to either a positive or negative recommendation for a program mounted at the corresponding leaf node. The decision tree attempts to cover as many positive examples as possible but none of the negative examples.

The television programming recommender of the present invention processes a user profile, if available, and the viewing history of a user to generate a decision tree. The decision tree is built using a decision tree process that implements a "top-down divide and conquer" approach. The decision tree can thereafter be applied to an electronic program guide to make program recommendations. The program recommendations may be, for example, a set of recommended programs that may be of interest to a particular viewer.

A more complete understanding of the present invention, as well as further features and advantages of the present invention, will be obtained by reference to the following detailed description and drawings.

DETAILED DESCRIPTION

Figure 1:
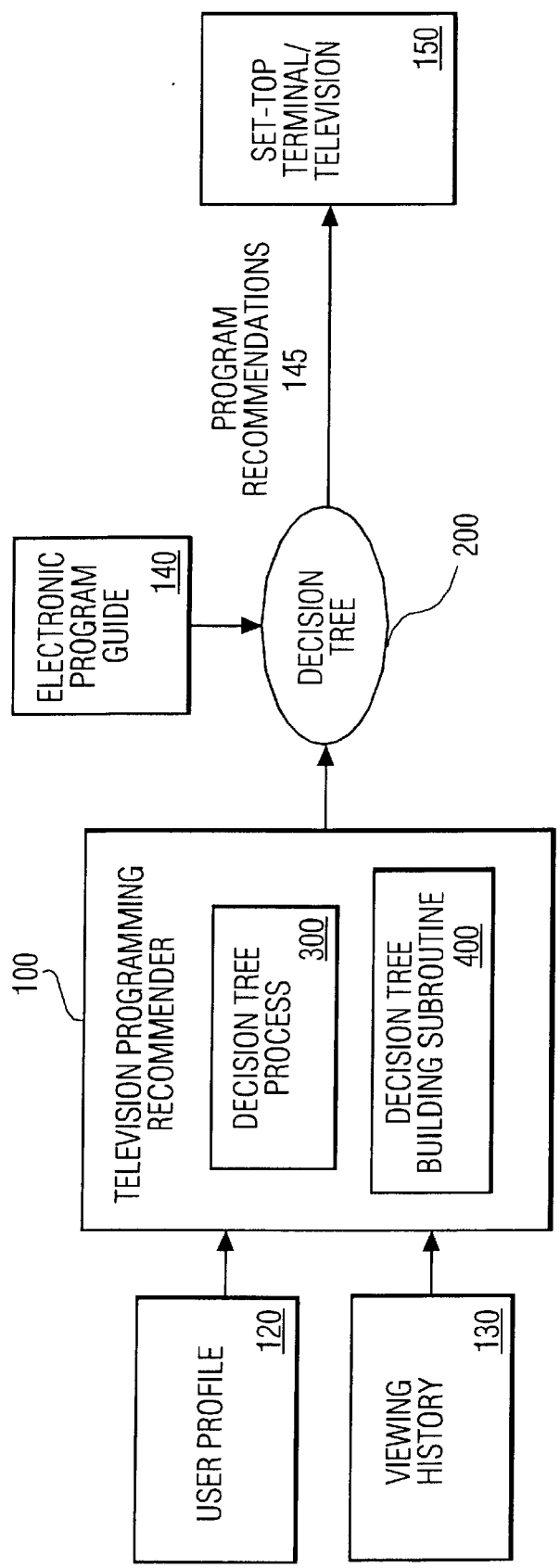
FIG. 1 illustrates a television programming recommender in accordance with the present invention.

FIG. 1 illustrates a television programming recommender 100 in accordance with the present invention. The disclosed television programming recommender 100 utilizes inductive principles to identify a set of recommended programs that may be of interest to a particular viewer. The present invention monitors a user's viewing history and analyzes the shows that are actually watched by a user (positive examples) and the shows that are not watched by the user (negative examples). Thereafter, the present invention discriminates between the positive and negative examples by building a decision tree that attempts to cover as many positive examples as possible but none of the negative examples.

According to another feature of the present invention, the television programming recommender 100 makes recommendations without requiring any explicit profile information from the user. When available, explicit user profile information augments the recommendations produced by the television programming recommender 100. The television programming recommender 100 typically learns by observing the user's viewing habits over time and generalizing the viewing habits to build a user profile that attempts to cover as many positive examples as possible but none of the negative examples.

As shown in FIG. 1, the television programming recommender 100 processes a user profile 120, if available, and a user's viewing history 130 to generate a decision tree 200. It is noted that the results of processing the user viewing history 130 can be stored in the form of updates to the user profile 120. The decision tree 200 may be applied to an electronic program guide 140 to make program recommendations. The program recommendations may be, for example, a set of recommended programs that may be of interest to a particular viewer.

As shown in FIG. 1, the television programming recommender 100 contains a decision tree process 300, discussed further below in conjunction with FIG. 3, that generates a decision tree for a given user, by invoking a decision tree building subroutine 400, discussed further below in conjunction with FIG. 4. The television programming recommender 100 may be embodied as any computing device, such as a personal computer or workstation, that contains a processor, such as a central processing unit (CPU), and memory, such as RAM and ROM.

Figure 2:
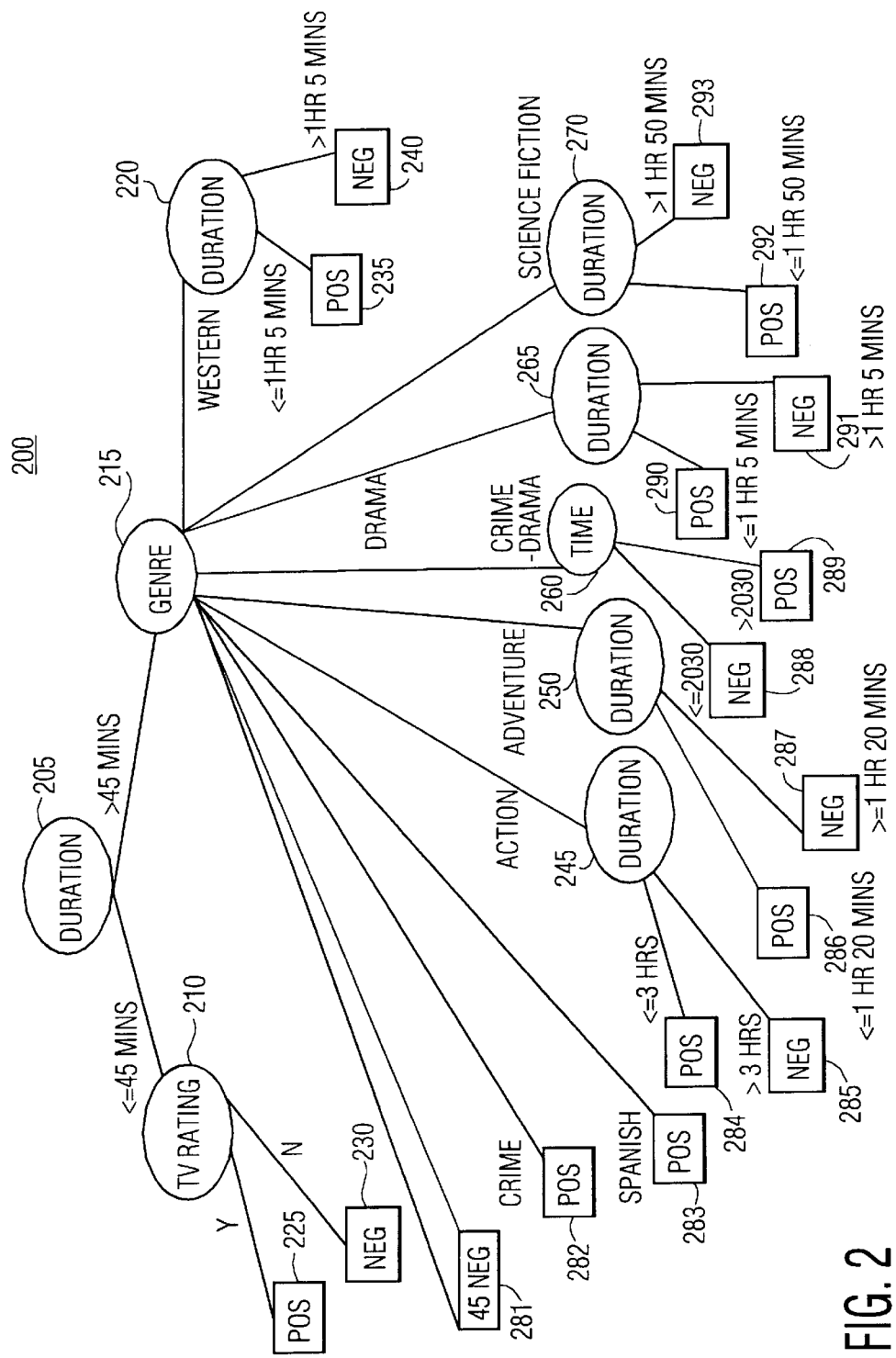
FIG. 2 illustrates a hierarchical decision tree that positions the various attributes of television programs in the tree based on a ranking of the entropy of each attribute.

For each positive and negative program example (i.e., programs watched and not watched), a number of well-known attributes are classified in the user profile, such as the time, date, duration, channel, rating, title and genre of a given program. As shown in FIG. 2, the various attributes are positioned in the hierarchical decision tree 200 based on a ranking of the entropy of each attribute. The illustrative decision tree 200 includes a root node 205 and a number of sub-nodes, such as sub-nodes 210, 220, 245, 250, 260, 265 and 270. Each node and sub-node in the decision tree 200 corresponds to a given attribute from the user profile. Each leaf node in the decision tree 200, such as the leaf nodes 225, 230, 235, 240, and 281–293, corresponds to either a positive or negative recommendation for a program mounted at the corresponding leaf node.

For example, if a given program in the training data has a duration of more than 45 minutes, but less than or equal to 65 minutes, and is a western (genre), the program will be classified under leaf node 235 as a positive example. Thereafter, if a given program in the test data has values meeting this criteria for these attributes the program will be a recommended program.

Figure 3:
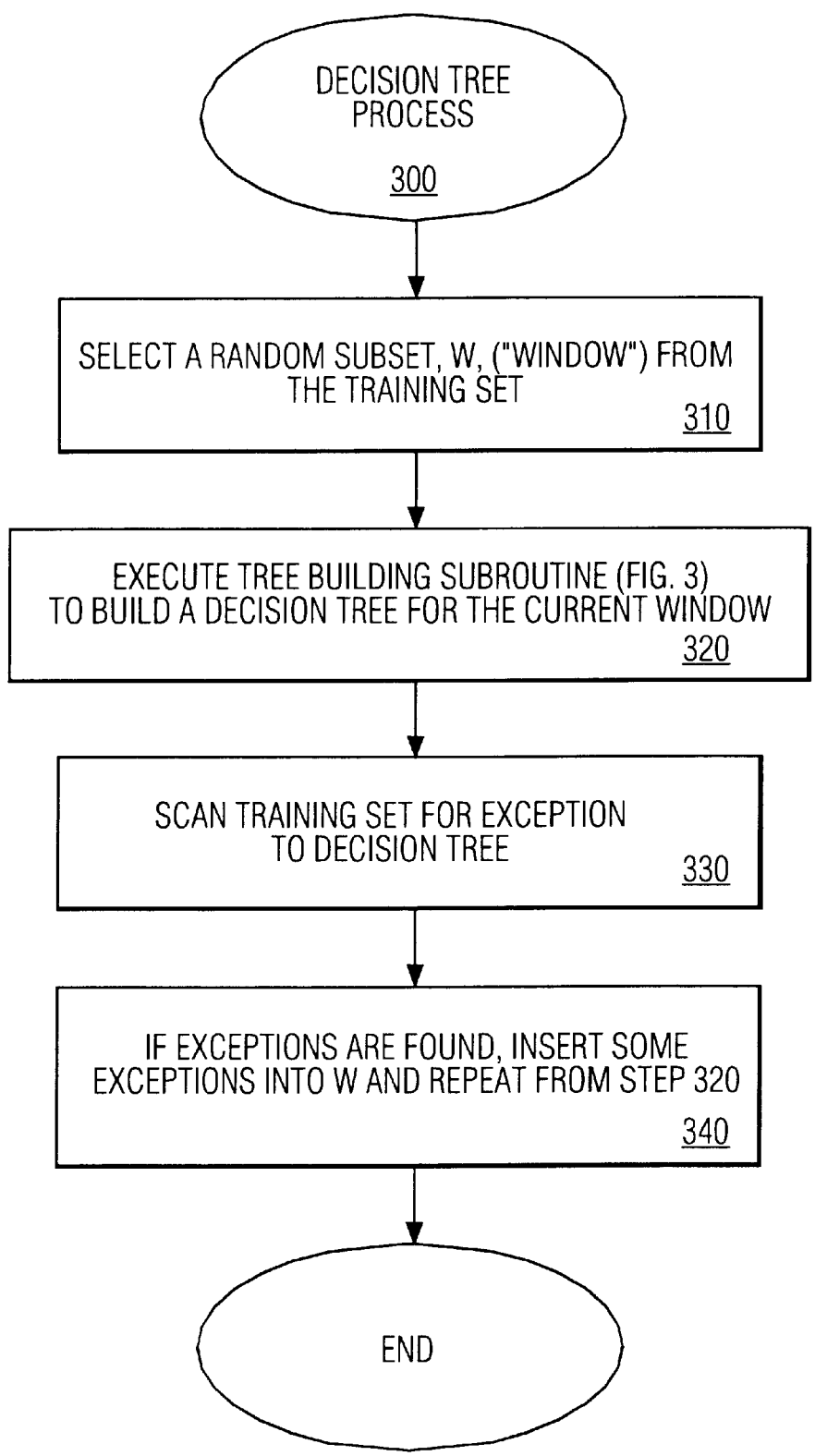
FIG. 3 is a flow chart describing an exemplary decision tree process embodying principles of the present invention.

The decision tree 200 is built using a decision tree process 300, shown in FIG. 3, that implements a "top-down divide and conquer" approach. The decision tree 200 can thereafter be converted to rules. The decision tree rules allow the introspective analysis of the behavior of the present invention. The decision tree techniques of the present invention are based on the well-established theory of Ross Quinlan, discussed, for example, in C4.5: Programs for Machine Learning, Morgan Kaufmann Publishers, Palo Alto, Calif. 1990, incorporated by reference herein. In addition, the decision tree is easily calculated, can be used in real-time and can be extended to any number of classes.

Decision Tree Principles

Decision Trees are based on the well-established theory of concept learning developed in the late 1950s by Hunt et. al. See, for example, Hunt et al., Experiments in Induction, Academic Press, New York (1966). It was further extended and made popular by Breiman et. al. Breiman et al., Classification and Regression Trees, Belmont, Calif. (Wadsworth, 1984); Quinlan J. R., Learning Efficient Classification Procedures and their Application to Chess End Games, Michalski R. S., Carbonell J. G. and Mitchell T. M. (Eds.), in Machine Learning: An Artificial Approach, Vol. 1, Morgan Kaufmann Publishers Inc., Palo Alto, Calif. (1983); Quinlan J. R., Probabilistic Decision Trees, Kodratoff Y. and Michalski R. S. (Eds.), in Machine Learning: An Artificial Approach, Vol. 3, Morgan Kaufmann Publishers Inc., Palo Alto, Calif., (1990); and Quinlan J. R., C4.5: Programs for Machine Learning, Morgan Kaufmann Publishers, Sam Mateo, Calif. (1993).

The basic method for constructing a decision tree is as follows: Let T be a set of training cases and let the classes be denoted as $\{C_1, C_2, \ldots, C_k\}$. The following three possibilities exist:

T contains one or more cases, all belonging to a single class $C_j$:

The decision tree for T is a leaf identifying class $C_j$.

T contains no cases:

The decision tree is again a leaf, but the class to be associated with the leaf must be determined from information other than T. For example, the leaf can be chosen with the aid of background knowledge about the domain.

T contains cases that belong to a mixture of classes:

In such a case, the approach is to refine T into subsets of cases that seem to be heading towards, single class collection of cases. A test is so chosen, based on a attribute, that has one or more mutually exclusive outcomes $\{O_1, O_2, \ldots, O_n\}$. T is partitioned into subsets T1, $T_2, \ldots, T_n$, where $T_i$ contains all the cases in T that have outcome $O_i$ of the chosen outcome. The decision tree for T consists of a decision node identifying the test, and one branch for each possible outcome. The same tree-building approach is applied recursively to each subset of training cases, such that the ith branch leads to the decision tree constructed from the subset $T_i$ of training cases.

The tree building process depends on the choice of an appropriate test. Any test that divides T in a nontrivial way, so that at least two of the subsets $\{T_i\}$ are not empty, will eventually result in a partition into single class subsets, even if all or most of them contain a single training case. However, the objective of the present invention is not to merely build a tree from any partition but to build a tree that reveals the structure of the data set and has predictive power for unseen cases. The test is normally chosen based on gain criterion, based on information theory and explained below.

Suppose that we have some test with n possible outcomes that partitions the set T of training cases into subsets $T_1$, $T_2, \ldots, T_n$. If this test is to be evaluated without exploring subsequent divisions of the $T_i$'s, the only information available to us is the distribution of classes in T and its subsets. Let S be any set of cases and let, freq($C_i$, S) denote the number of cases in S that belong to class $C_i$ and $|S|$ be the number of cases in set S. The information theory that underpins the criterion for selecting the test is as follows: the information conveyed by a message depends on its probability and can be measured in bits as minus the logarithm to base 2 of that probability. As an example, if there are eight equally probable messages, the information conveyed by any one of them is $-\log_2(1/8)$ or 3 bits. On selecting one case at random from a set S of cases that belongs to some class $C_j$, then that message would have a probability of $$\frac{freq(C_j, S)}{|S|}$$

and the information the message conveys is $$-\log_2\left(\frac{freq(C_j, S)}{|S|}\right) \text{ bits.}$$

In order to find the expected information from such a message pertaining to class membership, we sum over the classes in proportion to their frequencies in S, giving $$info(S) = -\sum_{j=1}^{k} \frac{freq(C_j, S)}{|S|} \times \log_2\left(\frac{freq(C_j, S)}{|S|}\right) \text{ bits.}$$

On applying to the set of training cases, info(T) measures the average amount of information needed to identify the class of a case in T. This quantity is often known as the entropy of the set S. When T has been partitioned in accordance with n outcomes of a test X, the expected information can then be found as the weighted sum over the subsets and is given by:

$$info_X(T) = \sum_{i=1}^{n} \frac{|T_i|}{|T|} \times info(T_i).$$

The following quantity:

$$gain(X) = info(T) - info_X(T)$$

measures the information that is gained by partitioning T in accordance with the test X and is often called as the gain criterion. This criterion, then, selects a test to maximize the information gain commonly referred to as the mutual information between the text X and the class.

Although the gain criterion gives good results, it has a serious deficiency namely that of having a strong bias in favor of tests with many outcomes [Quinlan, 1990]. As an example, consider a hypothetical medical diagnostic task in which one of the attributes contains patient identification. Since every such identification is intended to be unique, partitioning the set of training cases on the values of this attribute will lead to a large number of subsets, each containing just one case. As all of these one case subsets would contain cases of a single class, $info_X(T)$ would be 0. Thus the information gain from using this attribute to partition the set of training cases is maximal. However, from the point of view of prediction, such a division is of not much use.

The bias inherent in the gain criterion is rectified by normalization wherein the apparent gain attributable to tests with many outcomes is adjusted. Now consider the information content of a message pertaining to a case that indicates not the class to which the case belongs, but to the outcome of the test. Analogous to the definition of info(S), we have $$split\ info(X) = -\sum_{i=1}^{n} \frac{|T_i|}{|T|} \times \log_2\left(\frac{|T_i|}{|T|}\right).$$

This represents the potential information generated by dividing T into n subsets, whereas the information gain measures the information relevant to classification that arises from the same division. Then, the expression gain ratio(X)=gain(X)/split info(X)

expresses the proportion of information generated by the split. When the split information is small, this ratio is unstable. To avoid this, the gain ratio criterion selects a test to maximize the ratio subject to the constraint that the information gain must be at least as great as the average gain over all tests examined.

The description above for the construction of a decision tree was based on the assumption that the outcome of a test for any case can be determined. However, in reality data often as missing attribute values. This could be because the value is not relevant to a particular case, was not recorded when the data was collected, or could not be deciphered by the subject responsible for entering the data. Such incompleteness is typical of real-world data. We are then left with two choices: either a significant proportion of available data must be discarded and some test cases pronounced unclassifiable, or the algorithms must be amended to cope with missing attribute values. In most situations, the former is unacceptable as it weakens the ability to find patterns. Modification of the criteria for dealing with missing attribute values can then be realized as follows.

Let T be the training set and X a test based on some attribute A, and suppose that the value of A is known only in a fraction F of the cases in T info(T) and $info_X(T)$ are calculated as before, except that only cases with known values of A are taken into account. The definition of gain can then be amended to:

gain(X)=probability A is known×(info(T)−$info_X(T)$)+probability A is not known×0=F×(info(T)−$info_X(T)$)).

This definition of gain is nothing but the apparent gain from looking at cases with known values of the relevant attribute, multiplied by the fraction of such cases in the training set. Similarly the definition of split info(X) can also be altered by regarding the cases with unknown values as an additional group. If a test has n outcomes, its split information is computed as if the test divided the cases into n+1 subsets. Using the modified definitions of gain and split info partitioning the training set is achieved in the following way. When a case from T with known outcome $O_i$ is assigned to subset $T_i$, the probability of that case belonging in subset $T_i$ is 1 and in all other subsets 0. However, when the outcome is not known, only a weaker probabilistic statement can be made. If the case has a known outcome, this weight is 1; if the case has an unknown outcome, the weight is just the probability of outcome $O_i$ at that point. Each subset $T_i$ is then a collection of possibly fractional cases so that $|T_i|$ can be re-interpreted as the sum of the fractional weights of the cases in the set. It is possible that the training cases in T might have non-unit weights to start with, since T might be one subset of an earlier partition. In general, a case from T with weight w whose outcome is not known is assigned to each subset $T_i$ with weight w×probability of outcome $O_i$.

The latter probability is estimated as the sum of the weights of cases in T known to have outcome $O_i$, divided by the sum of the weights of the cases in T with known outcomes on this test.

If we assume the classes to be 'shows-watched' and 'shows-not-watched', then the format of the DT is such that, it has nodes and leaves where nodes correspond to some test to be performed and leaves correspond to the two classes. Testing an unknown case (show) now involves in parsing the tree to determine as to which class the unknown case belongs to. However, if at a particular decision node we encounter a situation wherein the relevant attribute value is unknown, so that the outcome of the test cannot be determined, the system then explores all possible outcomes and combines the resulting classifications. Since there can now be multiple paths from the root of a tree or from the subtree to the leaves, the classification is then a class distribution rather than a single class. When the class distribution for the unseen case has been obtained, the class with the highest probability is assigned as the predicted class.

FIG. 3 is a flow chart describing an exemplary decision tree process 300 embodying principles of the present invention. As shown in FIG. 3, the decision tree process 300 initially selects a random subset, W, from the training data during step 310. Thereafter, the decision tree process 300 executes the decision tree building subroutine 400, discussed further below in conjunction with FIG. 4, during step 320 to build a decision tree for the current window, W.

Once the decision tree building subroutine 400 has built the decision tree for the current window, W, the training set is scanned for exceptions to the decision tree during step 330. As previously indicated, the decision tree process randomly selects a subset of positive and negative examples from the total set of examples given to it and uses the subset to build a decision tree. Thereafter, the decision tree process 300 applies the generated tree on the remaining examples during step 330. If any example gets misclassified, the decision tree process 300 adds the misclassified example (exceptions) to the originally generated random subset, in the following manner. If exceptions to the decision tree are found during step 330, then one or more of the exceptions are inserted into the window, W, during step 340 and program control repeats from step 320. If no exceptions to the decision tree are found during step 330, then program control terminates. This process is continued until no performance improvement can be found from one iteration to the next.

In a further variation, examples are given to the decision tree process 300 based on an assumption of what the users likes and dislikes, where the user has graded the shows, for example, on a scale of 1 to 5. These grades can be incorporated into the decision tree in such a way that some bias is added. Namely, the process 300 adds the misclassified example only if the user's grade exceeds a predefined (or user-specified) value, such as 3. In other words, the user indicates how important it is for him or her that the system should recommend shows that he or she likes/dislikes. In this manner, the present invention will be more tailored to the user's likes/dislikes. Likewise, there will be some performance improvement as the system does not attempt to cover all the examples.

Figure 4:
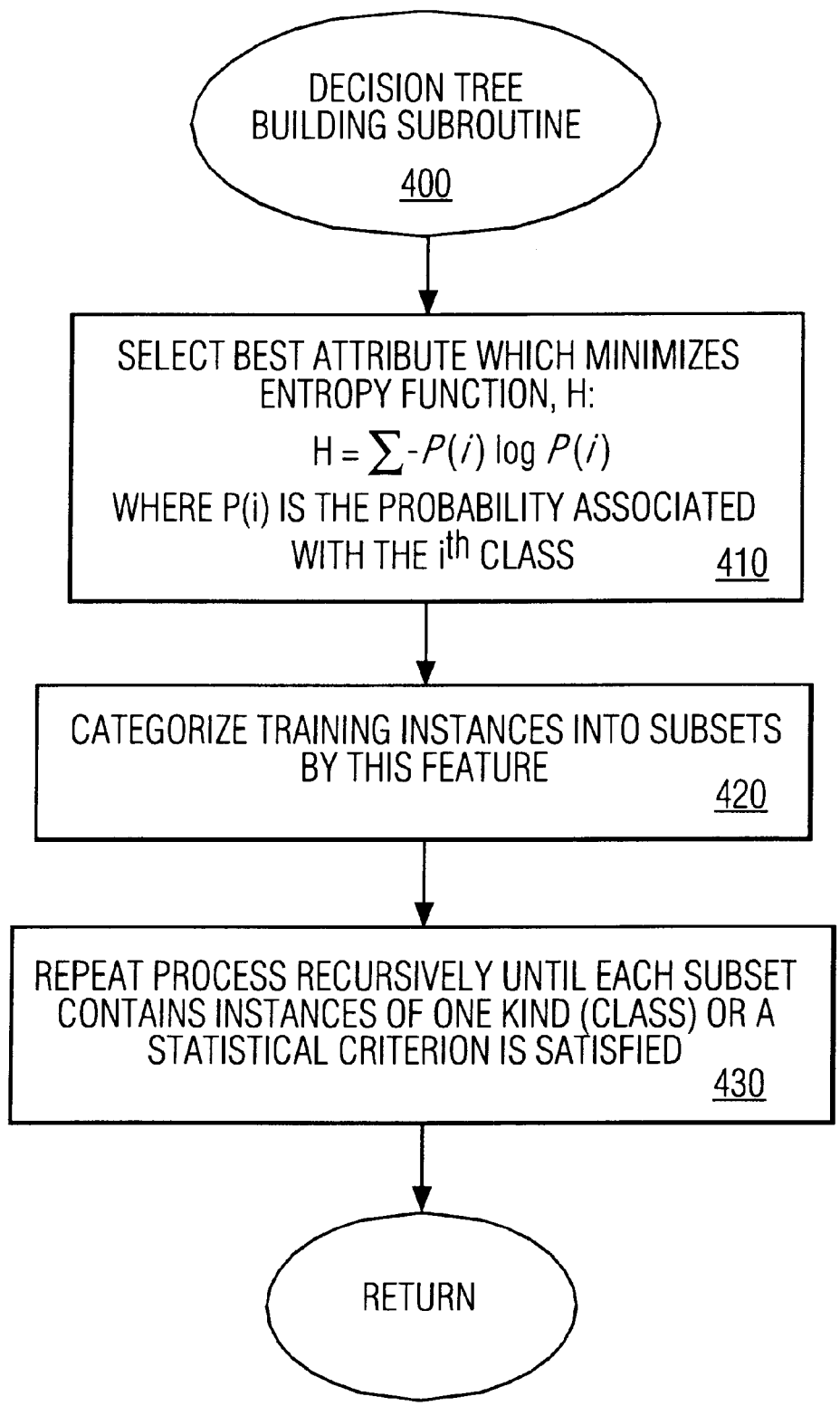
FIG. 4 is a flow chart describing an exemplary decision tree building subroutine embodying principles of the present invention.

FIG. 4 is a flow chart describing an exemplary decision tree building subroutine 400 embodying principles of the present invention. As shown in FIG. 4, the decision tree building subroutine 400 initially selects the best attributeduring step 410 that minimizes the entropy function, H, as follows:

$$H = \Sigma - P(i) \log P(i)$$

where P(i) is the probability associated with the $i^{th}$ class. Thereafter, the training instances are categorized during step 420 into subsets by this attribute.

Finally, the process is repeated recursively during step 430 until each subset contains instances of one kind (class) or a predefined statistical criterion is satisfied. Program control then returns to the decision tree process 300 (step 330).

Decision Tree Example

Figures 5, 6:
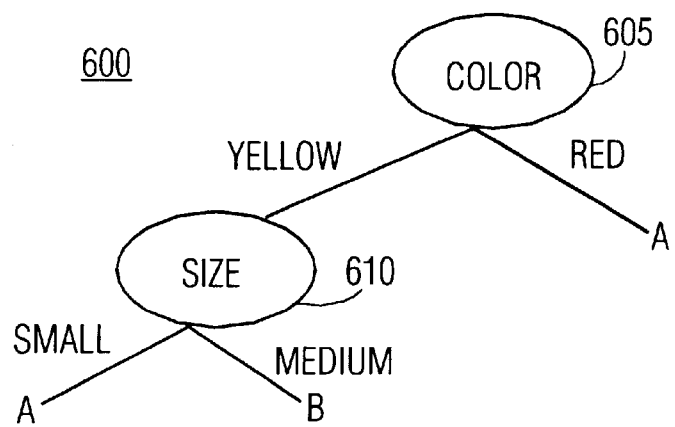
FIG. 5 is a sample table illustrating the creation of a decision tree in accordance with well-known techniques.
FIG. 6 illustrates the resulting decision tree corresponding to the example of FIG. 5.

FIG. 5 is a sample table 500 that illustrates the creation of a decision tree in accordance with well-known techniques. As shown in FIG. 5, the table 500 contains a plurality of records, each associated with different combinations of the attributes size, color and surface, as identified in fields 520, 530, 540, respectively. Each record has been classified into a given class, as identified in field 510.

According to the decision tree building subroutine 400, the decision tree is constructed by first calculating the entropy for each attribute (size, color and surface) during step 410, as follows:

$$\text{Size: } H = \frac{1}{6}\left(-\frac{1}{1}\log\frac{1}{1}\right) + \frac{4}{6}\left(-\frac{2}{4}\log\frac{2}{4} - \frac{2}{4}\log\frac{2}{4}\right) + \frac{1}{6}\left(-\frac{1}{1}\log\frac{1}{1}\right) = 0.462$$

$$\text{Color: } H = \frac{3}{6}\left(-\frac{2}{3}\log\frac{2}{3} - \frac{1}{3}\log\frac{1}{3}\right) + \frac{3}{6}\left(-\frac{3}{3}\log\frac{3}{3}\right) = 0.318$$

$$\text{Surface: } H = \frac{5}{6}\left(-\frac{3}{5}\log\frac{3}{5} - \frac{2}{5}\log\frac{2}{5}\right) + \frac{1}{6}\left(-\frac{1}{1}\log\frac{1}{1}\right) = 0.56$$

The attribute "color" is selected during step 420 as the root node 605, since it has the minimum entropy. Therefore, the attribute "color" is removed from the attributes and the process is repeated during step 430, as follows:

$$\text{Size: } H = \frac{1}{3}\left(-\frac{1}{1}\log\frac{1}{1}\right) + \frac{2}{3}\left(-\frac{2}{2}\log\frac{2}{2}\right) = 0$$

$$\text{Surface: } H = \frac{3}{3}\left(-\frac{2}{3}\log\frac{2}{3} - \frac{1}{3}\log\frac{1}{3}\right) = 0.636$$

On the second pass through the data, the attribute "size" is selected during step 420 as the second decision node 610, since it has the minimum entropy. The resulting decision tree is shown in FIG. 6.

Once the decision tree 200 is created in accordance with the present invention, the decision tree can be applied to an electronic program guide 140 to identify a set of programs that will likely be of interest to the user. For each program in the electronic program guide 140, the decision tree is traversed to classify the program into one of the leaf nodes. Based on the assigned leaf node, a given program is either a positive or negative recommendation.

It is to be understood that the embodiments and variations shown and described herein are merely illustrative of the principles of this invention and that various modifications may be implemented by those skilled in the art without departing from the scope and spirit of the invention.

What is claimed is:

1. A method for obtaining a recommendation for a television program for a user, said program having attributes, said method comprising the steps of:

obtaining a user profile;

obtaining a viewing history for said user;

analyzing positive and negative examples of training programs that are liked by said user;

generating, using the user profile and viewing history, a new user profile containing a number of attributes for said positive and negative examples;

positioning said attributes in a hierarchical decision tree; and determining a recommendation for said television program based on a location of said television program in said decision tree.

2. The method of claim 1, wherein said new profile also includes information provided by said user.

3. The method of claim 1, wherein said recommendation is a positive or negative recommendation.

4. The method of claim 1, wherein said positive or negative examples are scored by said user.

5. The method of claim 4, wherein said score is utilized to bias the processing of examples that are misclassified in said decision tree.

6. The method of claim 1, wherein placement of said attributes in said decision tree is based on a ranking of an entropy of each of said attributes.

7. The method of claim 6, wherein said entropy, H, of each of said attributes is obtained using the following expression:

$$H = \Sigma - P(i)\log P(i)$$

where P(i) is the probability associated with the $i^{th}$ class.

8. The method of claim 1, wherein said positioning step further comprises the steps of selecting an attribute that minimizes an entropy function, H, categorizing said training data into subsets by this attribute; and repeating said method recursively until each subset contains instances of one kind or a predefined statistical criterion is satisfied.

9. The method of claim 1, further comprising the step of applying said decision tree to additional positive and negative examples to identify a misclassified example.

10. The method of claim 9, wherein said positioning step further comprises the step of inserting said misclassified example into said original positive and negative examples and repeating said positioning step until a predefined threshold is satisfied.

11. A method for obtaining a recommendation for a television program for a user, said program having attributes, said method comprising the steps of:

obtaining a user profile;

obtaining examples of programs that are liked and disliked by said user;

generating, using the user profile and the examples programs, a hierarchical decision tree having nodes comprised of said attributes, said hierarchy based on a ranking of the entropy of each of said attributes; and recommending said television program based on a location of said television program in said decision tree.

12. The method of claim 11, wherein said profile also includes information provided by said user.

13. The method of claim 11, wherein said recommendation is a positive or negative recommendation.

14. The method of claim 11, wherein said positive or negative examples are scored by said user.

15. The method of claim 14, wherein said score is utilized to bias the processing of examples that are misclassified in said decision tree.

16. The method of claim 11, wherein the placement of said attributes in said decision tree is based on a ranking of the entropy of each of said attributes.

17. The method of claim 16, wherein said entropy, H, of each of said attributes is obtained using the following expression:

$$H = \Sigma - P(i)\log P(i)$$

where P(i) is the probability associated with the $i^{th}$ class.

18. The method of claim 11, wherein said positioning step further comprises the steps of selecting an attribute that minimizes said entropy function, H, categorizing said training data into subsets by this attribute; and repeating said method recursively until each subset contains instances of one kind or a predefined statistical criterion is satisfied.

19. The method of claim 11, further comprising the step of applying said decision tree to additional positive and negative examples to identify a misclassified example.

20. The method of claim 19, wherein said positioning step further comprises the step of inserting said misclassified example into said original positive and negative examples and repeating said positioning step until a predefined threshold is satisfied.

21. A system for obtaining a recommendation for a television program for a user, said program having attributes, comprising:

a memory for storing computer readable code; and a processor operatively coupled to said memory, said processor configured to:

obtain a user profile;

obtain a viewing history for said user;

analyze positive and negative examples of training programs that are liked by said user;

generate, using the user profile and the positive and negative examples, a new user profile containing a number of attributes for said positive and negative examples;

position said attributes in a hierarchical decision tree; and determine a recommendation for said television program based on a location of said television program in said decision tree.

22. A system for obtaining a recommendation for a television program for a user, said program having attributes, comprising:

a memory for storing computer readable code; and a processor operatively coupled to said memory, said processor configured to:

obtain a user profile;

obtain examples of programs that are liked and disliked by said user;

generate, using the user profile and examples of programs, a hierarchical decision tree having nodes comprised of said attributes, said hierarchy based on a ranking of the entropy of each of said attributes; and recommend said television program based on a location of said television program in said decision tree.

* * * * *